(12) United States Patent
Muwwakkil

(10) Patent No.: US 12,161,218 B1
(45) Date of Patent: Dec. 10, 2024

(54) ALL IN ONE DENTAL CARE DEVICE

(71) Applicant: Lorenia Muwwakkil, Romulus, MI (US)

(72) Inventor: Lorenia Muwwakkil, Romulus, MI (US)

(*) Notice: Subject to any disclaimer, the term of this patent is extended or adjusted under 35 U.S.C. 154(b) by 495 days.

(21) Appl. No.: 17/463,929

(22) Filed: Sep. 1, 2021

Related U.S. Application Data

(60) Provisional application No. 63/216,150, filed on Jun. 29, 2021.

(51) Int. Cl.
| | |
|---|---|
| *A45D 44/18* | (2006.01) |
| *A46B 5/00* | (2006.01) |
| *A46B 9/04* | (2006.01) |
| *A46B 15/00* | (2006.01) |
| *A61C 15/04* | (2006.01) |
| *B65D 35/02* | (2006.01) |

(52) U.S. Cl.
CPC ........ *A46B 15/0073* (2013.01); *A46B 5/0095* (2013.01); *A46B 9/04* (2013.01); *A46B 15/001* (2013.01); *A46B 15/0044* (2013.01); *A46B 15/0095* (2013.01); *A61C 15/043* (2013.01); *B65D 35/02* (2013.01); *A46B 2200/1066* (2013.01)

(58) Field of Classification Search
CPC ............ A46B 15/0069; A46B 15/0071; A46B 15/0073; A46B 15/0044; A46B 15/001; A46B 5/0095; A46C 15/043
USPC ................................................ 132/309, 311
See application file for complete search history.

(56) References Cited

U.S. PATENT DOCUMENTS

| | | | | |
|---|---|---|---|---|
| 2,656,843 | A * | 10/1953 | Boulicault | A45D 44/18 401/269 |
| 4,802,255 | A * | 2/1989 | Breuer | A46B 15/001 401/268 |
| 4,919,155 | A * | 4/1990 | Yasuda | A45D 8/24 132/278 |
| 5,676,167 | A * | 10/1997 | Garner | A46B 15/0071 132/309 |
| 6,766,807 | B2 | 7/2004 | Piccolo et al. | |
| 7,198,051 | B1 | 4/2007 | Festa | |
| 7,201,172 | B2 | 4/2007 | Nanda | |
| 8,776,806 | B2 | 7/2014 | Hohlbein et al. | |
| 9,049,921 | B1 * | 6/2015 | Rackston | A46B 5/0095 |
| D778,060 | S | 2/2017 | Finkel et al. | |
| 10,842,255 | B2 | 11/2020 | Gorich et al. | |
| D922,078 | S | 6/2021 | Deyhim | |
| 2002/0121283 | A1 | 9/2002 | Piccolo et al. | |

(Continued)

*Primary Examiner* — Rachel R Steitz
(74) *Attorney, Agent, or Firm* — Maiorana Patent Law, PA

(57) ABSTRACT

An apparatus comprising a handle, a toothbrush head and a cover. The handle may comprise a flat surface, a cavity and a first connector. The toothbrush head may comprise a plurality of bristles at a first end and a second connector at a second end. The cover may be configured to expose the cavity when not placed over the cavity and conceal the cavity when the cover is fit over the cavity. The cavity may be configured to store a floss dispenser. The floss dispenser may comprise floss and a cutter. The cavity may enable the floss dispenser to be replaced. The floss dispenser may be exposed on said the surface when the door is opened. The first connector may be configured to be removably attached to the second connector to enable the toothbrush head to connect with the handle.

20 Claims, 8 Drawing Sheets

(56) References Cited

U.S. PATENT DOCUMENTS

| | | |
|---|---|---|
| 2003/0188761 A1 | 10/2003 | Garcia et al. |
| 2004/0134510 A1* | 7/2004 | van Vilsteren ..... A46B 15/0071 |
| | | 132/309 |
| 2005/0211262 A1 | 9/2005 | Raab |
| 2005/0268934 A1 | 12/2005 | Macias et al. |
| 2006/0248670 A1 | 11/2006 | Nanda |
| 2007/0028941 A1 | 2/2007 | Oronsky et al. |
| 2011/0286784 A1 | 11/2011 | Gipson |
| 2013/0000658 A1 | 1/2013 | Nguyen et al. |
| 2015/0027488 A1* | 1/2015 | Charles Ray ...... A46B 15/0071 |
| | | 132/309 |
| 2018/0279764 A1 | 10/2018 | Hill |

* cited by examiner

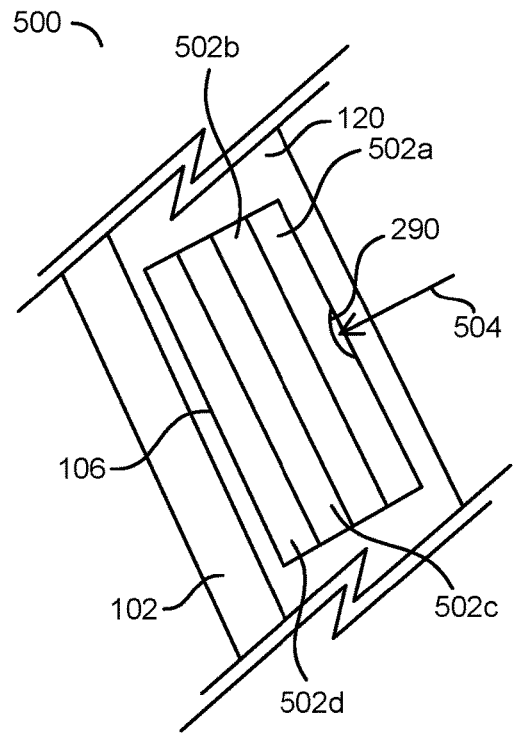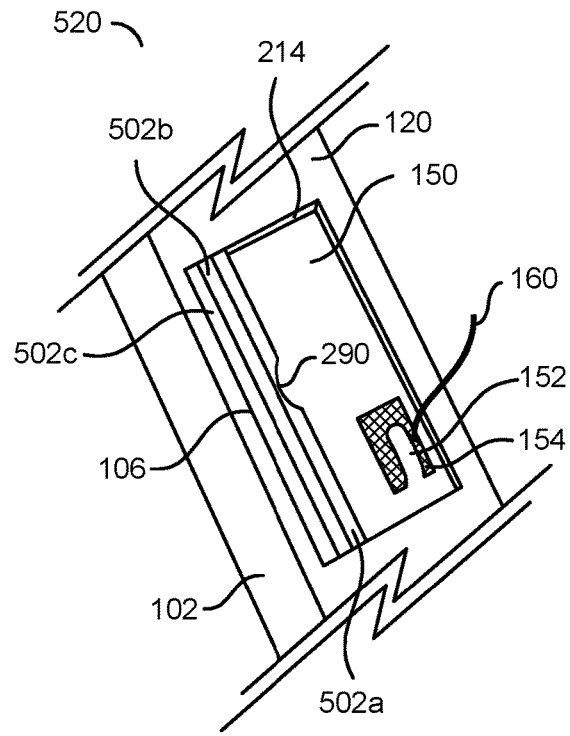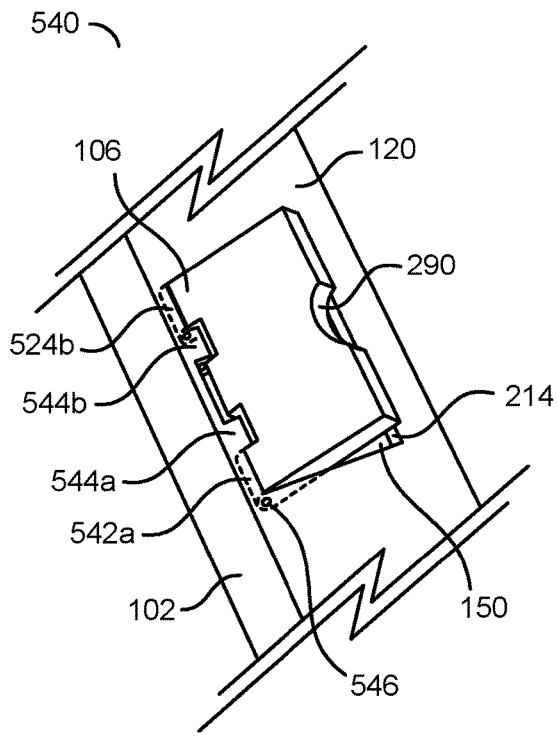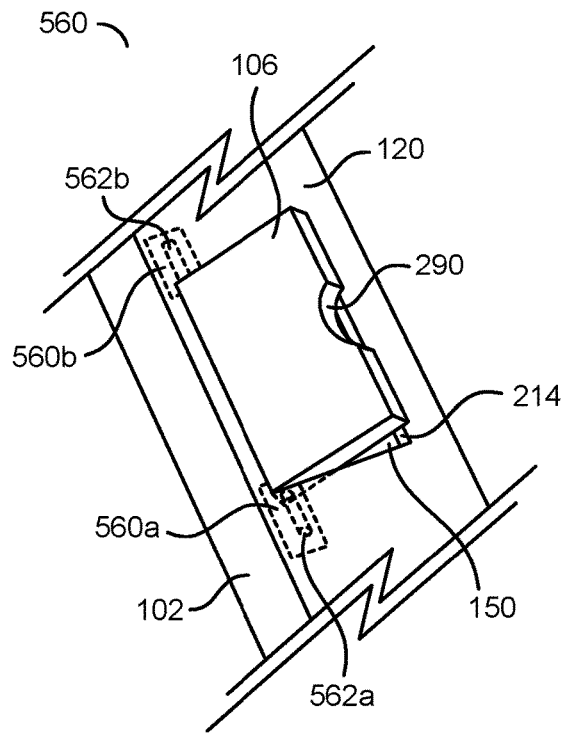

ALL IN ONE DENTAL CARE DEVICE

This application relates to U.S. Patent Application No. 63/216,150, filed on Jun. 29, 2021, which is hereby incorporated by reference in its entirety.

FIELD OF THE INVENTION

The invention relates to dental hygiene generally and, more particularly, to a method and/or apparatus for implementing an all in one dental care device.

BACKGROUND

Many people do not floss as recommended. Flossing contributes greatly to dental hygiene and oral health. However, while most people brush regularly, flossing is less common. Disposable flossers (i.e., a flossy) helps make flossing more convenient, but creates significant waste (i.e., each small piece of floss is intended to be single-use and must have a plastic handle large enough to operate).

Keeping track of dental hygiene items can be frustrating. In the home, each person needs storage space for a toothbrush as well as a floss dispenser, or disposable flossers. In travel situations, each traveler needs to have a toiletry bag and extra items take up space. Toothbrushes are a commonly forgotten item while traveling. Many do without flossing while traveling. If a person uses the same toothbrush at home as well as traveling, a good toothbrush is often lost while traveling. Without convenient options, many people risk their oral health.

It would be desirable to implement an all in one dental care device.

SUMMARY

The invention concerns an apparatus comprising a handle, a toothbrush head and a cover. The handle may comprise a flat surface, a cavity and a first connector. The toothbrush head may comprise a plurality of bristles at a first end and a second connector at a second end. The cover may be configured to expose the cavity when not placed over the cavity and conceal the cavity when the cover is fit over the cavity. The cavity may be configured to store a floss dispenser. The floss dispenser may comprise floss and a cutter. The cavity may enable the floss dispenser to be replaced. The floss dispenser may be exposed on the surface when the door is opened. The first connector may be configured to be removably attached to the second connector to enable the toothbrush head to connect with the handle.

BRIEF DESCRIPTION OF THE FIGURES

Embodiments of the invention will be apparent from the following detailed description and the appended claims and drawings.

FIG. 11 is a diagram illustrating a sliding cover in a closed position over a floss dispenser.

FIG. 12 is a diagram illustrating a sliding cover in an opened position over a floss dispenser.

FIG. 13 is a diagram illustrating a cover with a hinge.

FIG. 14 is a diagram illustrating a cover with a dowel.

DETAILED DESCRIPTION OF THE EMBODIMENTS

Embodiments of the present invention include providing an all in one dental care device that may (i) provide flossing and brushing, (ii) comprise a cavity to store a floss dispenser, (iii) comprise a cavity to store single-use toothpaste containers, (iv) implement a removable toothbrush head that connects to a handle, (v) provide a single package for travel, (vi) implement a flat surface for a cover to conceal a floss dispenser, (vii) provide a flosser end that may use floss from the floss dispenser, (viii) provide a stand that comprises a floss dispenser and/or (ix) be easy to use.

Embodiments of the present invention may be configured to promote dental hygiene and/or oral care. A toothbrush may be implemented with a removable and/or replaceable toothbrush head. A cavity may be implemented in a handle of the toothbrush for storage. A cover may be configured to fit over the cavity in order to conceal the cavity. The cavity may store a floss dispenser. Storing the floss dispenser in the cavity may enable the toothbrush to provide toothbrush bristles for brushing teeth and floss for flossing teeth in a single package.

Figure 1:
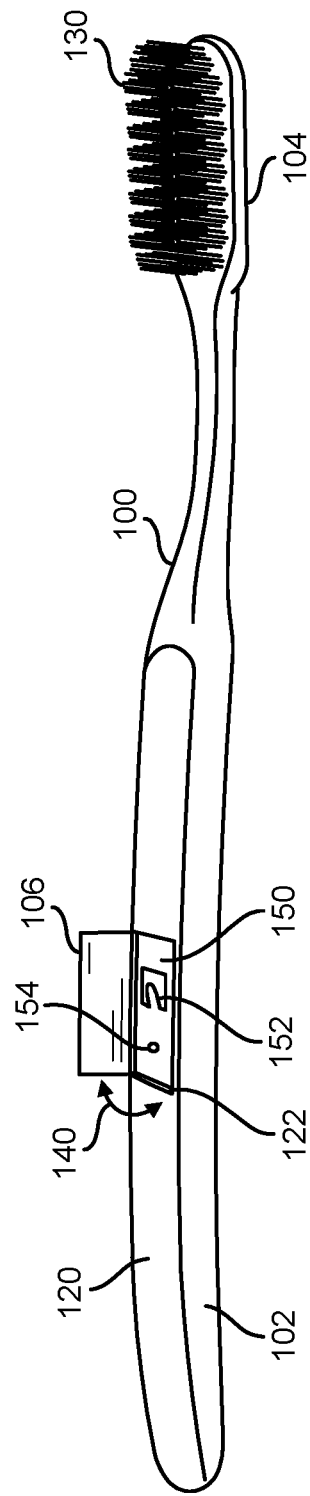
FIG. 1 is a diagram illustrating an example embodiment of the present invention.

Referring to FIG. 1, a diagram illustrating an example embodiment of the present invention is shown. An apparatus (or device) 100 is shown. The apparatus 100 may implement a toothbrush. The toothbrush 100 may be an all in one teeth cleaning, dental care and/or oral health care device. The all in one dental care toothbrush 100 may be configured to be used as a toothbrush for brushing teeth and/or provide floss for flossing teeth in a single package.

The toothbrush 100 may comprise a handle 102, a toothbrush head 104 and a cover 106. The handle 102 may be connected to the toothbrush head 104. The cover 106 may be removably attached to the handle 102. The cover 106 may be configured to cover a cavity implemented in the handle 102. The cover 106 may be configured to conceal and expose the cavity implemented in the handle 102. Details of the cavity implemented in the handle 102 may be described in association with FIG. 3.

The handle 102 may comprise a flat surface 120. The flat surface 120 may enable the cover 106 to sit flat on the handle 102. A cavity opening 122 is shown. The cavity opening 122 is shown on the flat surface 120. The cavity opening 122 may comprise a hole on the flat surface 120 that provides access to the cavity of the handle 102.

The toothbrush head 104 may comprise bristles 130. The bristles 130 may be toothbrush bristles. The toothbrush bristles 130 may enable the toothbrush 100 to be used to brush teeth. In an example, a user may hold the handle 102 and apply the toothbrush bristles 130 to teeth. In some embodiments, the bristles 130 may be configured to provide a flossing action along with a brushing action. For example, one row of the bristles 130 may comprise a strand of floss that may enable flossing. In another example, one or more rows of the bristles 130 may be longer and/or stiffer to enable flossing.

A double-ended arrow 140 is shown. The double-ended arrow 140 may indicate an opening and closing action of the cover 106. In an example where the cover 106 is connected to the flat surface 120 with a hinge, the arrow 140 may indicate a swinging action of the cover 106. The cover 106 may be configured to expose the cavity when not placed over the cavity. In the example shown, the cover 106 may be open and the cavity opening 122 is visible. The cover 106 may conceal the cavity when the cover 106 is fit over the cavity. In an example, when the cover 106 is closed, the cover 106 may be generally flush with and appear to be a part of the flat surface 120 of the handle 102.

A floss dispenser 150 is shown. The floss dispenser 150 may be inserted into the cavity of the handle 102. In the example shown, the floss dispenser 150 may be within the cavity and visible through the cavity opening 122. The cavity opening 122 may be shown at a level above the floss dispenser 150 (e.g., the floss dispenser 150 may not occupy the entire space of the cavity). The floss dispenser 150 within the cavity may be concealed when the cover 106 is closed. In the example shown with the cover 106 open, a top surface of the floss dispenser 150 may be exposed.

The floss dispenser 150 may comprise floss (not shown), a cutter 152 and a floss opening 154. The cutter 152 may provide a sharp edge to enable a user to cut off a desired size (e.g., length) of the floss. The floss opening 154 may enable the floss to be extracted from the floss dispenser 150. For example, the user may pull a desired length of the floss from the floss opening 154, and then pull the desired length of the floss across the cutter 152 in order to separate the desired length of floss from the apparatus 100.

Figure 2:
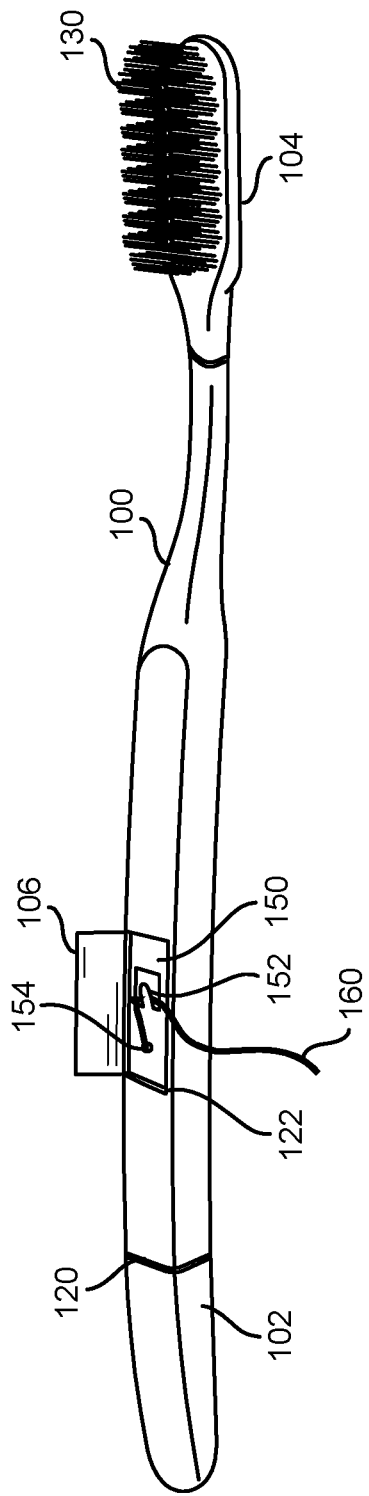
FIG. 2 is a diagram illustrating floss extending from a floss dispenser.

Referring to FIG. 2, a diagram illustrating floss extending from a floss dispenser is shown. The toothbrush 100 is shown. The handle 102, the toothbrush head 104, and the cover 106 are shown. Similar to the example shown in association with FIG. 1, the handle 102 may comprise the flat surface 120, the cavity opening 122 is shown, the toothbrush head 104 may comprise the bristles 130 and the floss dispenser 150 is shown inserted into the cavity of the handle 102.

The cover 106 is shown in an open state. In some embodiments, the cover 106 may swing open and closed over top of the cavity. For example, the cover 106 may be attached to the flat surface 120 by a hinge that may be configured to enable the cover 106 to open and close while remaining attached to the handle 102. A hinge attachment may prevent the cover 106 from being misplaced when exposing the cavity. In some embodiments, the cover 106 may be configured to removably attach to the handle 102 and/or the flat surface 120. In an example, the cover 106 may be configured to provide a friction fit with the cavity opening 122. For example, the cover 106 may snap into the cavity (e.g., the cover 106 may comprise a male component that twists and/or snaps into a female component on the cavity opening 122 or the cover 106 may comprise a female component that twists and/or snaps into a male component on the cavity opening 122). In some embodiments, the cover 106 may be configured to be magnetically held in place over the cavity opening 122 (e.g., the cavity opening 122 may implement a magnet and the cover 106 may comprise a material that may be magnetically attracted and/or the cover 106 may implement a magnet and the cavity opening 122 may be surrounded by a material that may be magnetically attracted to form a magnetic hold). The type of connection between the cover 106 and the handle 102 to enable the cover 106 to conceal the cavity opening 122 may be varied according to the design criteria of a particular implementation.

Floss 160 is shown extending from the floss dispenser 150. The floss 160 may be pulled out of the floss dispenser 150 from the floss opening 154. In an example, a spool of the floss 160 may be stored within the floss dispenser 150. The user may pull the floss 160 from the floss opening 154 and cut the floss 160 to a desired length using the cutter 152.

The toothbrush 100 may be configured to provide all in one dental care. The all in one dental care may comprise the bristles 130 to enable the toothbrush 100 to brush the teeth of a user. The all in one dental care may comprise the floss 160 to enable the user to floss teeth using the floss 160 stored within the cavity of the handle 102. For example, when traveling the user may not need to bring both a toothbrush and floss, since the toothbrush 100 may enable the functionality of a toothbrush for brushing teeth and provide the floss 160 for flossing teeth.

Figure 3:
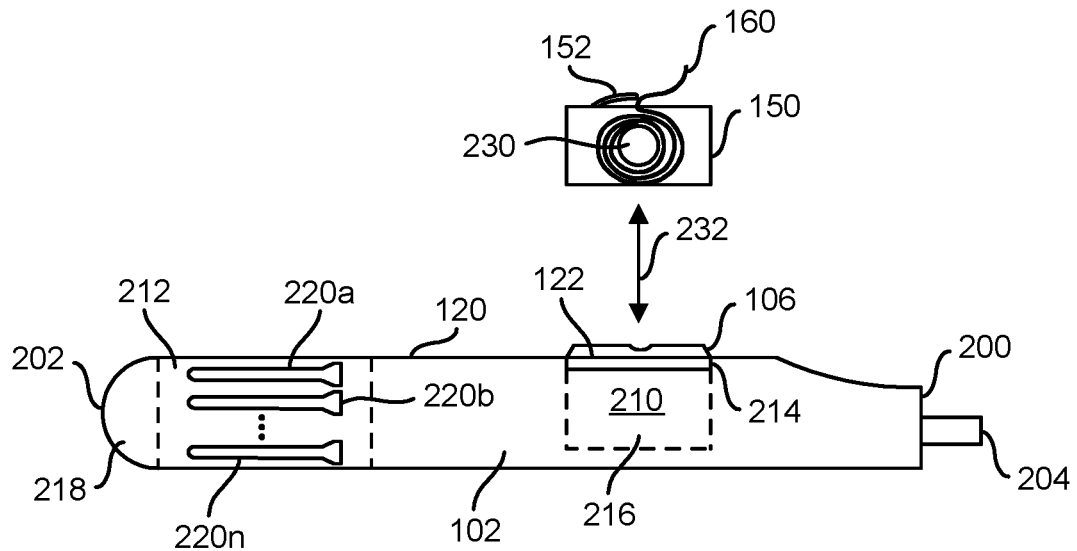
FIG. 3 is a diagram illustrating a toothbrush handle with a cavity for a floss dispenser and a cavity for toothpaste containers.

Referring to FIG. 3, a diagram illustrating a toothbrush handle with a cavity for a floss dispenser and a cavity for toothpaste containers is shown. The handle 102 is shown with the cover 106. The cover 106 is shown exposing the cavity opening 122. The handle 102 of the toothbrush 100 is shown without the toothbrush head 104 attached (e.g., the toothbrush head 104 may be removed).

The toothbrush handle 102 is shown having a top end 200 and a bottom end 202. The top end 200 may be configured to be connected to the toothbrush head 104 (not shown). The bottom end 202 may be a base of the handle 102. The top end 200 may be an opposite end of the handle 102 from the bottom end 202. For example, when the user is using the toothbrush 100 to brush teeth, the top end 200 may be directed towards the mouth of the user and the bottom end 202 may be directed away from the mouth of the user.

A connector 204 is shown on the top end 200 of the handle 102. The connector 204 may be configured to attach to and disconnect from a compatible connector implemented on the toothbrush head 104. The connector 204 may enable the handle 102 to be removably attached to the toothbrush head 104. In the example shown, the connector 204 may comprise a male component that may be configured to snap into a complimentary female component implemented by the toothbrush head 104. In another example, the connector 204 may be configured to slide and lock into a complimentary connector implemented by the toothbrush head 104. In yet another example, the connector 204 may be implemented as a ridged plastic sleeve (or neck) at the top end 200 that may snap into a complimentary connector implemented by the toothbrush head 104. The type of the connector 204 implemented to enable the handle 102 to be connected to and disconnected from the toothbrush head 104 may be varied according to the design criteria of a particular implementation.

The handle 102 may comprise a cavity (or compartment) 210 and/or a cavity (or compartment) 212. The cavity 210 may be configured to store the floss dispenser 150. The cavity 212 may be configured to store other objects.

The cavity 210 may be located below the flat surface 120 of the handle 102. The cavity opening 122 may enable access to the cavity 210 when the cover 106 is open. The cavity 210 may extend partially through the depth of the handle 102. The depth of the cavity 210 may enable an object (e.g., the floss dispenser 150) to fit within the cavity 210.

The cavity 210 may be implemented slightly below a level of the flat surface 120. A surface depth 214 is shown. The surface depth 214 may comprise a small amount of space (e.g., 1 mm-3 mm thick). For example, the surface depth 214 may be a portion of the cavity 210 that may not be usable to store an object. The surface depth 214 may be configured to be occupied by the cover 106 when the cover 106 is closed (e.g., when the cover 106 is concealing the cavity 210). In an example, the surface depth 214 may be the same thickness of the cover 106. The surface depth 214 may enable the cover 106 to be flush with the flat surface 120 when the cover 106 is over top of the cavity 210. For example, the floss dispenser 150 may be exposed at a level that may be slightly below a level of the flat surface 120.

A support depth 216 is shown. The support depth 216 may not be part of the cavity 210. From the perspective shown, the support depth 216 may be a thickness of the handle 102 below the cavity 210. The support depth 216 may comprise the material of the handle 102. The support depth 216 may be configured to support the structure of the handle 102 around the cavity 210. For example, the support depth 216 may be configured to provide structural integrity for the handle 102 (e.g., prevent the handle 102 from breaking) when the user applies force onto the toothbrush 100 while brushing teeth. In some embodiments, the support depth 216 may comprise a different material than the rest of the handle 102. For example, the support depth 216 may comprise a stronger material than the rest of the handle 102 in order to provide reinforcement near the cavity 210.

The handle 102 may comprise the cavity 212 near the bottom end 202. A cover (or door) 218 is shown at the bottom end 202 of the handle 102. The cover 218 may be configured to expose the cavity 212 when opened and conceal the cavity 212 when closed. The cover 218 may be removably attached to the handle 102.

The cover 218 may be configured to expose an opening on the bottom end 202 to provide access to the cavity 212. In one example, the cover 218 may be attached to the handle 102 by a hinge that may enable the cover 218 to flip open and closed. In another example, the cover 218 may be threaded and configured to screw onto and off of complimentary threading implemented by the bottom end 202 of the handle 102. In yet another example, the cover 218 may be configured to provide a friction fit onto the handle 102 to snap on and snap off of the handle 102. The implementation of the cover 218 may be varied according to the design criteria of a particular implementation.

The cavity 212 may be longer (e.g., extend along a length of the handle 102) than the cavity 210. Objects 220a-220n are shown within the cavity 212. The objects 220a-220n may be tubes of toothpaste (e.g., toothpaste containers). In one example, the tubes of toothpaste 220a-220n may be configured to store a single-use amount of toothpaste. The single-use toothpaste containers 220a-220n may enable a user to store toothpaste in the handle 102 while traveling (e.g., so that the user does not need to bring an additional travel tube of toothpaste). The single-use toothpaste containers 220a-220n may each be used to apply a sufficient amount of toothpaste to the toothbrush bristles 130 for one teeth brushing session.

A side view of the floss dispenser 150 is shown. The floss dispenser 150 is shown outside of the cavity 210. The cutter 152 is shown at a top end of the floss dispenser 150. The floss 160 is shown extending from the floss dispenser 150. The floss dispenser 150 may contain a spool of floss 230. The user may pull the floss 160 from the floss opening 154 to unwind the floss spool 230.

An arrow 232 is shown. The arrow 232 may illustrate inserting the floss dispenser 150 into the cavity 210. The floss dispenser 150 may be inserted into the cavity 210 with the cutter 152 (and the floss opening, not shown) facing a direction that is exposed by the cavity opening 122 (so that the cutter 152 is on the same side of the handle 102 as the flat surface 120). In the example shown, the cavity opening 122 is shown facing upwards and the floss dispenser 150 may be inserted into the cavity 210 facing upwards.

The floss dispenser 150 may fit within the cavity 210. When the floss dispenser 150 is within the cavity 210, the floss dispenser 150 may sit at a level below the surface depth 214. By sitting below the surface depth 214, the cover 106 may conceal the floss dispenser 150 inside the cavity 210 when the cover 106 is over top of the cavity opening 122. In an example, the cover 106 may push down the cutter 152 when the cover 106 is placed into the cavity opening 122.

The arrow 232 is shown as a double-ended arrow. The arrow 232 may further illustrate the removal of the floss dispenser 150. The floss dispenser 150 may be inserted into and removed from the cavity 210. For example, when the floss spool 230 no longer has any more of the floss 160, the floss dispenser 150 may be replaced. An empty floss dispenser may be removed from the cavity 210 and a new floss dispenser may be inserted. In an example, the as floss dispenser 150 may be made available (e.g., sold) cartridges with a size that fits the cavity 210 of the toothbrush 100.

The floss dispenser 150 may be provided with various types of the floss 160. In one example, the floss dispenser 150 may be configured to provide the floss 160 as waxed floss. In another example, the floss dispenser 150 may be configured to provide the floss 160 as unwaxed floss. The floss 160 in the dispenser 150 may be flavored. For example, various implementations of the floss dispenser 150 may comprise the floss 160 having no flavor, a mint flavor, a bubble gum flavor, a peppermint flavor, a cinnamon flavor, etc. The types of the floss 160 and/or the number of options for the floss 160 may be varied according to the design criteria of a particular implementation.

The walls of the cavity 210 may be configured to hold the floss dispenser 150 in place. For example, the floss dispenser 150 may be configured to slide into the cavity 210 for a secure fit. The secure fit for the floss dispenser 150 in the cavity 210 may be secure enough to prevent the floss dispenser 150 from sliding out but loose enough that the user may remove the floss dispenser 150 when the floss spool 230 is empty. In one example, the walls of the cavity 210 may provide a friction fit for the floss dispenser 150. In another example, the walls of the cavity 210 may comprise snapping components to enable the floss dispenser 150 to snap into the cavity 210 for the secure fit. In yet another example, a bottom of the floss dispenser 150 may comprise a magnetic material and the walls of the cavity 210 may comprise a magnetic material to enable a magnetic hold. In still another example, the cavity 210 and the floss dispenser 150 may be configured for a spring loaded fit that may hold the floss dispenser 150 with a first press and then eject floss dispenser 150 with a second press. The mechanism used for holding the floss dispenser 150 in the cavity 210 and releasing the floss dispenser 150 from the cavity 210 may be varied according to the design criteria of a particular implementation.

In some embodiments, the floss dispenser 150 may be built into the handle 102. For example, the floss dispenser

150 may be configured to not be removed from the cavity 210. When the floss spool 230 is empty, instead of replacing the entire floss dispenser 150, the empty floss spool may be removed from the floss dispenser and the replacement floss spool 230 may be inserted into the floss dispenser 150.

When the toothbrush head 104 is attached to the handle 102, the toothbrush 100 may be configured to enable tooth brushing. When the floss dispenser 150 is inserted into the cavity 210, the toothbrush 100 may be configured to enable teeth flossing by providing the floss 160. When the single-use toothpaste containers 220*a*-220*n* are inserted into the cavity 212, the toothbrush 100 may be configured to provide toothpaste for tooth brushing. The teeth brushing, the teeth flossing and the toothpaste may comprise the all in one dental care implemented by the toothbrush 100.

Figure 4:
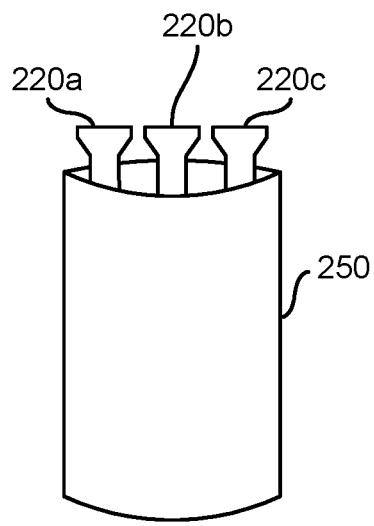
FIG. 4 is a diagram illustrating a package of single-use toothpaste containers.

Referring to FIG. 4, a diagram illustrating a package of single-use toothpaste containers is shown. A package 250 is shown. The package 250 is shown comprising the single-use toothpaste containers 220*a*-220*c*. In the example shown, the package 250 may store three of the single-use toothpaste containers 220*a*-220*c*. The package 250 may store other amounts of the single-use toothpaste containers (e.g., 220*a*-220*n*). The number of the single-use toothpaste containers 220*a*-220*n* stored in the package 250 may be varied according to the design criteria of a particular implementation.

The package 250 may be made available to provide the single-use toothpaste containers 220*a*-220*n* for storage in the cavity 212. The package 250 may be configured to provide one day's worth of the single-use toothpaste containers 220*a*-220*c* (e.g., three packages for brushing three times in a day). For example, the user may buy the package 250 and store the three single-use toothpaste containers 220*a*-220*c* in the cavity 212.

In some embodiments, the package 250 may comprise enough of the single-use toothpaste containers 220*a*-220*n* for a particular number of days. The package 250 may facilitate using the toothbrush 100 for traveling. In an example, the package 250 may comprise one week's worth of the single-use toothpaste containers 220*a*-220*n* to enable the user to store enough of the single-use toothpaste containers 220*a*-220*n* in the cavity 212 when traveling for a week. The cavity 212 may enable a user to store an appropriate amount of the single-use toothpaste containers 220*a*-220*n* to ensure that the user has enough toothpaste for a travel trip without needing to bring a separate tube of toothpaste.

Figure 5:
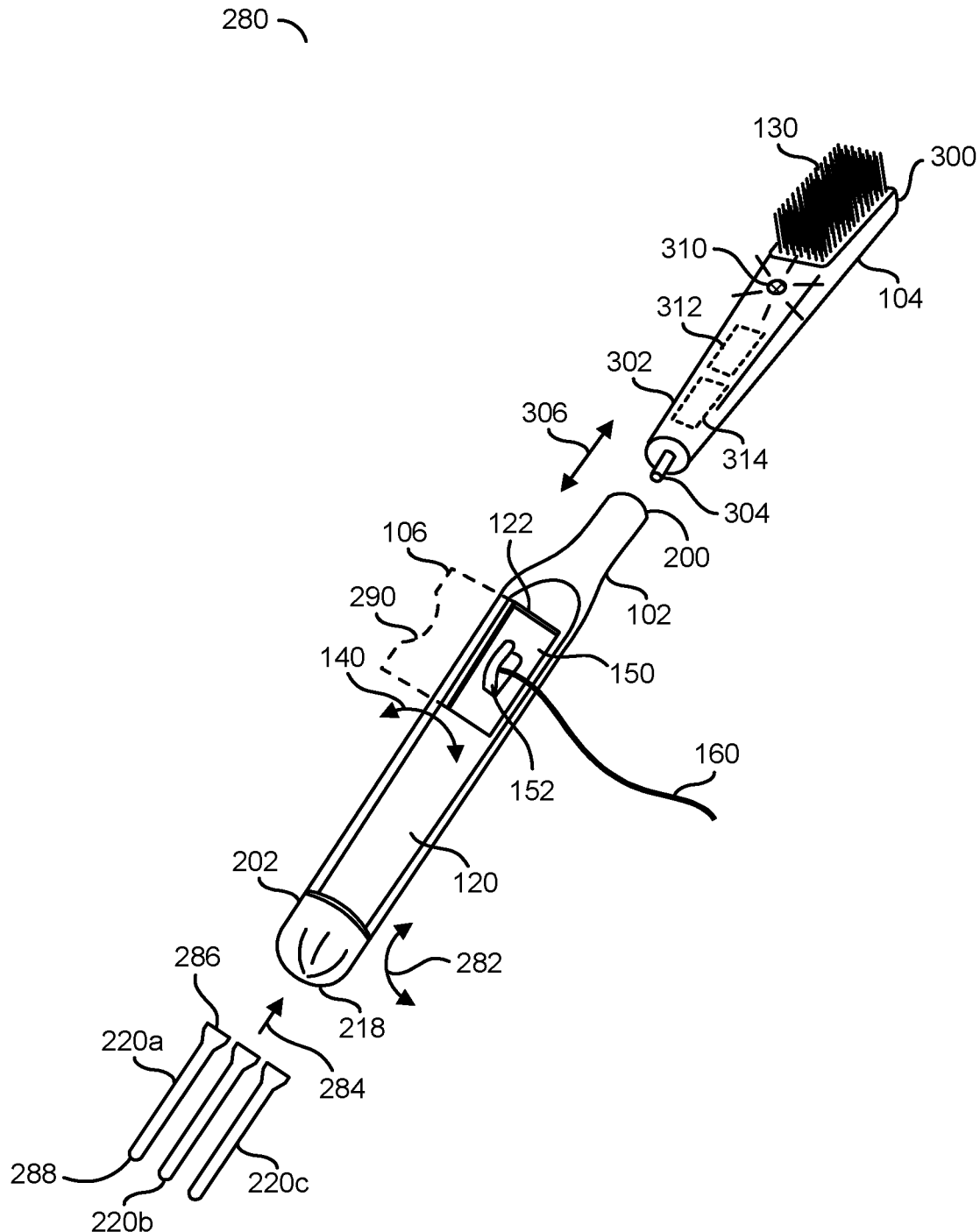
FIG. 5 is a diagram illustrating the toothbrush configured to store single-use toothpaste containers.

Referring to FIG. 5, a diagram illustrating the toothbrush configured to store single-use toothpaste containers is shown. An example embodiment 280 of the toothbrush 100 is shown. The example embodiment 280 may comprise the handle 102, the toothbrush head 104 and the cover 106. The toothbrush head 104 is shown detached from the handle 102.

The handle 102 is shown having the flat surface 120 with the cover 106 open to expose the floss dispenser 150 within the cavity 210. The floss dispenser 150 is shown through the cavity opening 122. The floss 160 is shown pulled along the cutter 152 (e.g., to cut a desired length of the floss 160). The cover 218 for the cavity 212 is shown at the bottom end 202 of the handle 102.

A double-ended arced arrow 282 is shown near the cover 218. The double-ended arced arrow 282 may illustrate the movement of the cover 218. In the example shown, the cover 218 may be covering the cavity 212 (e.g., closed over top of the cavity 212). The movement 282 of the cover 218 may enable the cover 218 to be opened to expose the cavity 212. For example, the movement 282 may illustrate the cover 218 swinging open in order to expose the cavity 212 within the handle 102.

An arrow 284 is shown extending from the single-use toothpaste containers 220*a*-220*c*. The single-use toothpaste containers 220*a*-220*c* are shown outside of the cavity 212. The arrow 284 may represent inserting the single-use toothpaste containers 220*a*-220*c* into the cavity 212. The single-use toothpaste containers 220*a*-220*c* may be inserted into the cavity 212 when the cover 218 is off of the bottom end 202 of the handle 102 (e.g., the cavity 212 is exposed).

The single-use toothpaste container 220*a* is shown with a flared end 286 and a rounded end 288. While the flared end 286 and the rounded end 288 is described with respect to the single-use toothpaste container 220*a*, each of the single-use toothpaste containers 220*a*-220*n* may implement the flared end 286 and the rounded end 288.

The flared end 286 may be configured to be twisted by the fingers of the user. Twisting the flared end 286 may force the toothpaste within the container 220*a* to be pushed out of the rounded end 288. For example, the pressure created by twisting the flared end 286 may force the toothpaste to start to burst out of the rounded end 288. Pushing the toothpaste out of the rounded end 288 may enable the user to apply the toothpaste out of the single-use toothpaste container 220*a* in a controlled manner. For example, when the user wants to apply toothpaste to the bristles 130, the user may hold the single-use toothpaste container 220*a* in one hand and with another hand twist the flared end 286. Once the toothpaste has been forced out of the rounded end 288, the user may slowly apply the toothpaste onto the bristles 130 by squeezing out the toothpaste from the toothpaste container 220*a*.

The cover 106 is shown comprising a notch 290. The notch 290 may provide an easy to grab section of the cover 106. The arrow 140 may illustrate the movement of the cover 106. For example, the cover 106 may conceal the cavity opening 122. The notch 290 may enable the user to gain leverage on the cover 106 to pull the cover 106 off of the cavity opening 122 in order to expose the floss dispenser 150.

The toothbrush head 104 may comprise a bristle end 300 and a connector end 302. The toothbrush bristles 130 may be located on the toothbrush head 104 near the bristle end 300. For example, when the user is brushing teeth, the bristle end 300 may be inserted into the mouth of the user and the connector end 302 may be directed away from the mouth of the user.

A connector 304 is shown on the connector end 302 of the toothbrush head 104. The connector 304 may be a complimentary connector for the connector 204 implemented on the top end 200 of the handle 102. The connector 304 may be configured to attach to and disconnect from the compatible connector 204 implemented on the handle 102. The connector 304 may enable the toothbrush head 104 to be removably attached to the handle 102. A double-ended arrow 306 is shown illustrating connecting the toothbrush head 104 to and disconnecting the toothbrush head 104 from the handle 102.

In the example shown, the connector 304 may comprise a male component that may be configured to snap into a complimentary female connector 204 implemented by the toothbrush handle 102 to provide a secure connection. In another example, the connector 304 may be configured to slide and lock (or twist and snap) into the complimentary connector 204 implemented by the toothbrush handle 102 to provide a secure connection. In yet another example, the connector 304 may be implemented as a ridged plastic sleeve (or neck) at the connector end 302 that may snap onto the complimentary connector 204 implemented by the toothbrush handle 102. The type of the connector 204 implemented by the handle 102 and the type of complimentary connector 304 implemented by the toothbrush head 104 to enable the handle 102 to be connected to and disconnected from the toothbrush head 104 may be varied according to the design criteria of a particular implementation.

A block (or circuit) 310, a block (or circuit) 312 and/or a block (or circuit) 314 are shown implemented by the toothbrush head 104. The circuit 310 may implement a light. The circuit 312 may implement a battery. The circuit 314 may implement a sensor. The toothbrush head 104 may comprise other components (not shown). The number, type and/or arrangement of the components of the toothbrush head 104 may be varied according to the design criteria of a particular implementation.

The light 310 may implement a light-emitting diode (LED). The LED 310 may be configured to indicate when the toothbrush head 104 should be replaced. For example, the LED 310 may be activated (e.g., emit light) to suggest to the user to replace the toothbrush head 104.

The battery 312 may be configured to provide power to the LED 310 and the sensor 314. The sensor 314 may be configured to detect a stiffness of the bristles 130 and/or sense other metrics that may indicate that the bristles 130 may no longer be in a suitable condition to brush teeth. The sensor 314 may be configured to determine when to replace the toothbrush head 104.

In one example, the sensor 314 may implement a timer. The timer sensor 314 may be configured to calculate how long the toothbrush head 104 has been attached to the handle 102. The time that the toothbrush head 104 has been attached to the handle 102 may be used as an estimate for how suitable the bristles 130 may be for brushing teeth. After a predetermined amount of time has been counted by the timer sensor 314, the LED 310 may be triggered to indicate that the toothbrush head 104 should be replaced. In an example, the timer sensor 314 may determine when a month has passed, two months have passed, three months have passed, etc.

In one example, the sensor 314 may implement an accelerometer. The accelerometer sensor 314 may be configured to detect an amount of movement of the toothbrush head 104. The movement of the toothbrush head 104 detected by the accelerometer sensor 314 may be used as an estimate for how suitable the bristles 130 may be for brushing teeth. After a predetermined number of movements detected (e.g., the accelerometer sensor 314 may be configured to detect movements that correspond to a stroke made while brushing teeth), the LED 310 may be triggered to indicate that the toothbrush head 104 should be replaced. The accelerometer sensor 314 may count the number of strokes to estimate how much the bristles 130 have been used in order to determine when to replace the toothbrush head 104.

In some embodiments, the toothbrush head 104 and/or the bristles 130 may be implemented using a color changing material. The color changing material of the toothbrush head 104 and/or the bristles 130 may be implemented to indicate when the toothbrush head 104 should be replaced. For example, the color changing material of the toothbrush head 104 and/or the bristles 130 may be implemented as an alternate to the LED 310, the battery 312 and/or the sensor 314. The color changing material of the toothbrush head 104 and/or the bristles 130 may be configured to change color (e.g., a color may fade, a color may change from one hue to another hue, a color coded indicator may change, a logo may be revealed due to a color change, etc.) in response to the usage of the toothbrush head 104. In one example, the color of the material of the toothbrush head 104 and/or the bristles 130 may be configured to change in response to an amount of time that the toothbrush head 104 has been exposed to the air (e.g., removed from a sealed package). In another example, the color of the material of the toothbrush head 104 and/or the bristles 130 may be configured to change in response to exposure to saliva over time. The method of detecting use of the toothbrush head 104 and the type of color change implemented may be varied according to the design criteria of a particular implementation.

The handle 102 and/or the toothbrush head 104 may be replaceable. For example, a new implementation of the handle 102 may be attached to the toothbrush head 104. In another example, a new implementation of the toothbrush head 104 may be attached to the handle 102. Generally, the toothbrush head 104 may be replaced when the bristles 130 are no longer suitable for brushing teeth.

The toothbrush head 104 may be implemented with the bristles 130 having varying stiffness. Different users may prefer the bristles 130 with different amounts of stiffness. In one example, the toothbrush head 104 may comprise the bristles 130 with a soft stiffness. In another example, the toothbrush head 104 may comprise the bristles 130 with a medium stiffness. In yet another example, the toothbrush head 104 may comprise the bristles 130 with a hard (or firm) stiffness. The type of the toothbrush head 104 may be selected by the user (or based on a recommendation from a dentist).

In some embodiments, the toothbrush head 104 may comprise a telescoping neck. For example, the connector end 302 may comprise a telescoping neck. The telescoping neck may enable the toothbrush head 104 to extend and retract. Extending or retracting the toothbrush head 104 may enable a desired length for the toothbrush 100 while being used (e.g., based on a comfort and/or preference of the user). Retracting the toothbrush head 104 may enable the toothbrush 100 to be a compact size during storage (e.g., for travel). The toothbrush head 104 may be extended during use.

The handle 102, the toothbrush head 104 and/or the cover 106 may be implemented with the same materials or different materials. The handle 102, the toothbrush head 104 and the cover 106 may be implemented using a lightweight material that may be non-toxic and environmentally safe. In an example, the lightweight material that may be non-toxic and environmentally safe may be a plastic material, an acrylic material, a polymer, etc. The handle 102, the toothbrush head 104 and/or the cover 106 may be implemented using various colors. In some embodiments, the handle 102 and the toothbrush head 104 may be implemented with different colors (e.g., a red handle and a blue toothbrush head). The toothbrush head 104 may be replaced with another version of the toothbrush head 104 to enable the user to mix and match colors between the toothbrush head 104 and the handle 102. In some embodiments, the handle 102, the toothbrush head 104 and/or the cover 106 may be implemented using a glow in the dark material. The cover 106 is shown with dotted lines. The dotted lines may illustrate a transparent or translucent material for the cover 106. For example, the cover 106 may be clear (e.g., see through) to enable the floss dispenser 150 to be seen even when the cover 106 is closed. The types of materials, the color and/or style of the handle 102, the toothbrush head 104 and/or the cover 106 may be varied according to the design criteria of a particular implementation.

Figure 6:
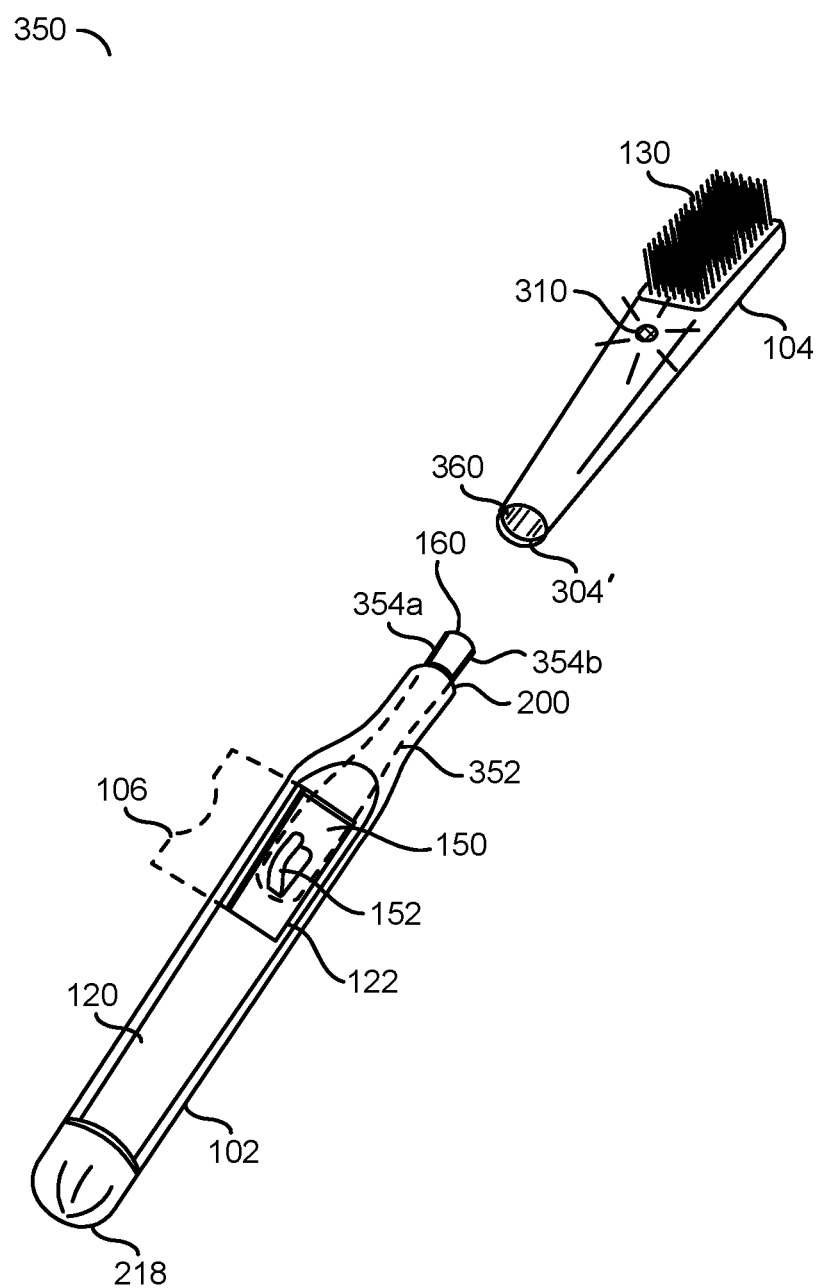
FIG. 6 is a diagram illustrating a handle with a flosser end exposed when a toothbrush head is disconnected.

Referring to FIG. 6, a diagram illustrating a handle with a flosser end exposed when a toothbrush head is disconnected is shown. An example embodiment 350 of the toothbrush 100 is shown. The example embodiment 350 may comprise the handle 102, the toothbrush head 104 and the cover 106. The toothbrush head 104 is shown detached from the handle 102.

The handle 102 is shown having the flat surface 120 with the cover 106 open to expose the floss dispenser 150 within the cavity 210. The floss dispenser 150 is shown through the cavity opening 122. The cover 218 is shown closed on the handle 102. The toothbrush head 104 is shown with the bristles 130, the connector 304' and the indicator LED 310.

A dotted path 352 and a pair of tines 354a-354b are shown on the handle 102. The dotted path 352 may represent a routing path for the floss 160. The pair of tines 354a-354b is shown on the top end 200 of the handle 102.

The floss 160 may be configured to be pulled along the routing path 352 and over the pair of tines 354a-354b. The routing path 352 may extend to and from the floss dispenser 150 to form a loop. By pulling the floss through the routing path 352 and back to the floss dispenser 150, the floss 160 may be pulled taught over the pair of tines 354a-354b. With the floss 160 pulled taught over the pair of tines 354a-354b, a flosser end may be formed.

The flosser end may be configured to enable the user to hold the handle 102 and use the handle 102 to control the floss 160 while applying the floss to teeth. For example, the flosser end may work similar to a disposable floss tool (e.g., a flossy). As the floss 160 is used with the pair of tines 354a-354b (e.g., becomes dirty by cleaning teeth), the user may pull additional floss 160 from the floss dispenser 150 over the pair of tines 354a-354b to ensure clean floss is available for flossing. Used floss may be cut on the return loop of the routing path 352 using the cutter 152. When the floss spool 230 is empty, the floss dispenser 150 may be replaced (or the floss spool 230 may be replaced) and the floss 160 may be rerouted over the pair of tines 354a-354b to form the flosser end.

The tines 354a-354b and the floss 160 pulled taught over the tines 354a-354b may be covered by the toothbrush head 104 when the toothbrush head 104 is attached to the handle 102. The toothbrush head 104 may be detached from the handle 102 in order to expose the tines 354a-354b and the floss 160 for the flosser end. For example, the user may attach the toothbrush head 104 to the handle 102 in order to use the bristles 130 to brush teeth and then remove the toothbrush head 104 from the handle 102 in order to use the flosser end to floss teeth.

The connector 304' on the toothbrush head 104 is shown as a sleeve. The sleeve for the connector 304' may comprise a ridge for connecting to the connector 204 of the handle 102. The connector 304' may comprise a hollow opening 360. The hollow opening 360 may enable the toothbrush head 104 to fit over the tines 354a-354b. For example, when the toothbrush head 104 is connected to the handle 102, the tines 354a-354b may fit inside the hollow opening 360.

Figure 7:
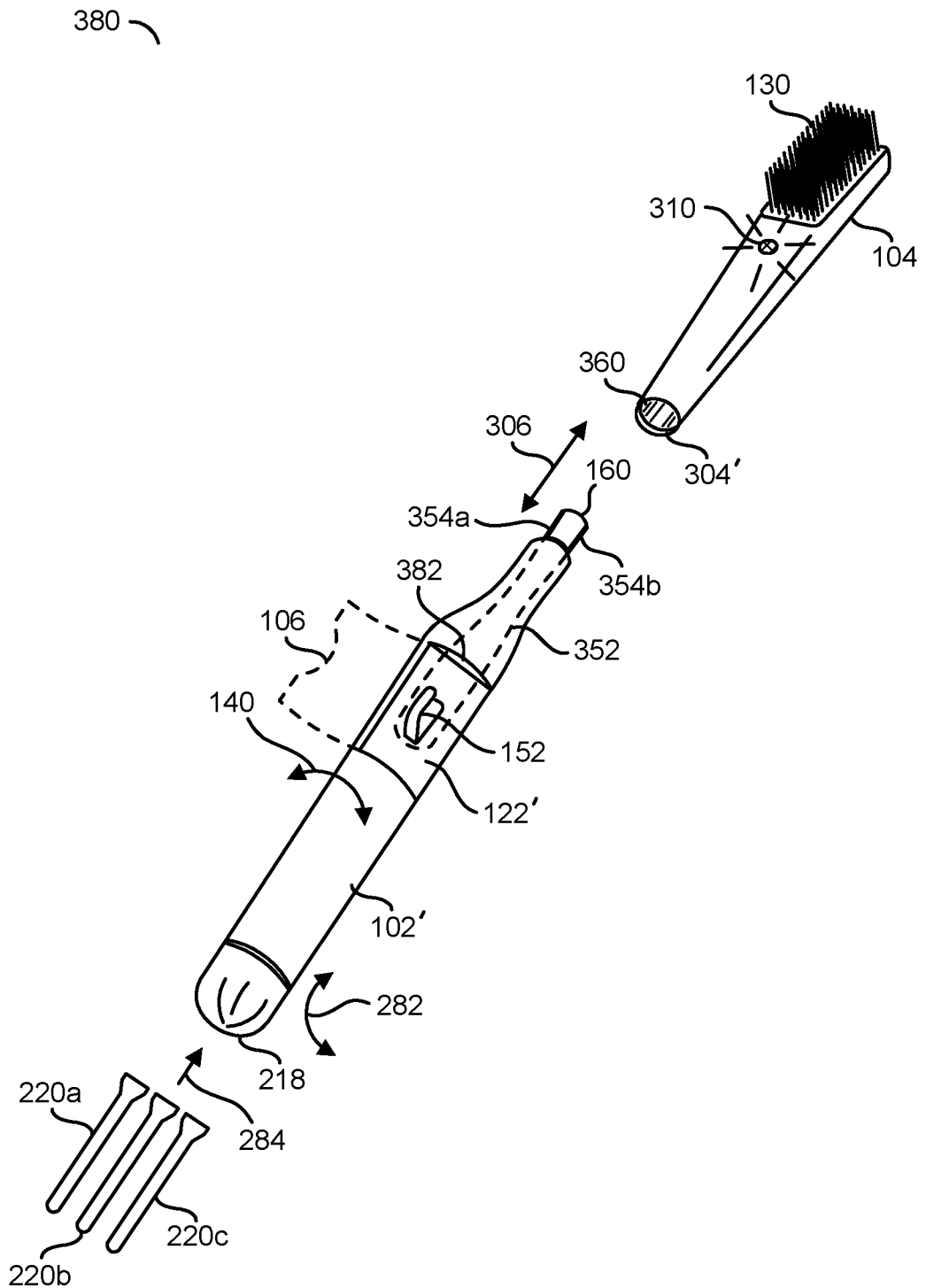
FIG. 7 is a diagram illustrating an alternate embodiment of the flosser end with the floss dispenser.

Referring to FIG. 7, a diagram illustrating an alternate embodiment of the flosser end with the floss dispenser is shown. An example embodiment 380 of the toothbrush 100 is shown. The example embodiment 380 may comprise the handle 102', the toothbrush head 104 and the cover 106. The toothbrush head 104 is shown detached from the handle 102'.

The cover 106 is shown open to expose the floss dispenser 150 within the cavity 210. The floss dispenser 150 is shown through the cavity opening 122'. The cover 218 is shown closed on the handle 102'. The movement 282 of the cover 218 is shown. The single-use toothpaste containers 220a-220n are shown (e.g., may be inserted into the cavity 212).

The routing path 352 is shown on the handle 102'. The floss 160 may be pulled taught over the tines 354a-354b in order to form the flosser end. The toothbrush head 104 is shown with the bristles 130, the connector 304' and the indicator LED 310. The hollow opening 360 may fit over top of the flosser end in order to cover or expose the flosser end based on the detachment 306 of the toothbrush head 104.

The handle 102' is shown without having the flat surface 120. In the flosser end embodiment 380 the handle 102' may be implemented having a rounded handle. For example, the rounded handle may have an ergonomic fit in the hand of the user.

The cavity opening 122' is shown. The floss dispenser 150 may fit in deeper into the cavity 210 in the flosser end embodiment 380. A depth edge 382 is shown. The depth edge 382 may extend deeper into the handle 102' than the embodiment of the toothbrush 100 with the flat surface 120. The cover 106 may close over the cavity opening 122'. In the embodiment 380 with the depth edge 382, there may be more space between the cover 106 and the floss dispenser 150 in the cavity 210. For example, in the embodiment 380 with the depth edge 382, the cover 106 may close without pressing down on the cutter 152.

In the embodiment 380 with the depth edge 382, the routing path 352 may have more depth in the handle 102' to form the routing path 352. A greater depth for the routing path 352 may enable a more secure fit for the floss 160 when being pulled over the tines 354a-354b.

Figure 8:
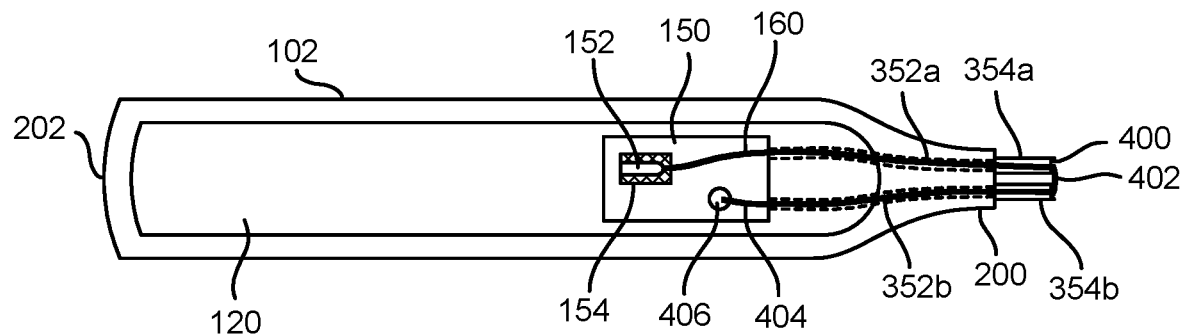
FIG. 8 is a diagram illustrating a routing path for floss to provide floss for the flosser end.

Referring to FIG. 8, a diagram illustrating a routing path for floss to provide floss for the flosser end is shown. The handle 102 of the toothbrush 100 is shown with the flosser end. For illustrative purposes the toothbrush head 104 and the cover 106 are not shown. The floss dispenser 150 is shown on the flat surface 120 of the handle 102. The flosser end with the tines 354a-354b is shown at the top end 200 of the handle 102.

The floss opening 154 is shown under the cutter 152. The floss 160 is shown extending from the floss opening 154. For example, the user may pull the clean floss 160 from the floss opening 154 of the floss dispenser 150.

The routing path 352a-352b is shown on the handle 102. The routing path 352a-352b may extend from the cavity 210 (e.g., where the floss dispenser 150 is inserted), through the flat surface 120 and towards the top end 200 of the handle 102. In some embodiments, the routing path 352a-352b may comprise an open path (e.g., a trench) in the handle 102. For example, the routing path 352a-352b may be carved into the surface of the handle to provide an uncovered pathway for the floss 160. In some embodiments, the routing path 352a-352b may comprise a tunnel through the handle 102 (e.g., a covered pathway). Generally, the routing path 352a-352b may be slightly larger than the thickness of the floss 160.

The floss 160 may be routed through the routing path 352a-352b. The routing path 352a-352b may provide a guide for the floss to be pulled from the floss dispenser 150, to the flosser end (e.g., the tines 354a-354b) and then pulled back to the floss dispenser 150 to enable the floss 160 to be pulled tight across the tines 354a-354b. The routing path 352a-352b may be configured to provide a friction fit for the floss 160 to help hold the floss across 160 the tines 354a-354b while the user applies the floss 160 to the teeth. The routing path 352a-352b may comprise an outgoing portion 352a and a return portion 352b. The outgoing portion 352a may provide a path for the floss 160 from the floss dispenser 150 to the tine 354a. The return portion 352b may provide a path for the floss 160 from the tine 354b back to the floss dispenser 150. A depression (or divot) 400 is shown on the tine 354a.

While the depression 400 is only shown on the tine 354a for illustrative purposes, the tine 354b may also comprise the depression 400. The depression 400 implemented on each of the tines 354a-354b may be configured to prevent the floss 160 from slipping off of the tines 354a-354b. The depression 400 may enable the floss 160 to be pulled across the tines 354a-354b for a secure hold. The depression 400 may generally have a size similar to the width of the floss 160 to provide a friction fit. In some embodiments, the depression 400 may be shaped to enable the floss 160 to snap into the depression 400 when sufficient force is applied onto the floss in the direction of the depression 400. For example, the shape of the opening for the depression 400 may comprise neck (or narrow space) where the floss 160 is inserted that may securely hold the floss 160 in the depression 400. Force may be applied in a direction away from the depression 400 in order to free the floss 160 from the neck. For example, the neck of the depression 400 may enable the floss 160 to be inserted and then threaded through the depression in order to pull more floss through the outgoing portion 352a of the routing path 352a-352b. In another example, the depression 400 may comprise a loop (e.g., similar to a needle head) and the floss may be threaded through the depression 400 to prevent the floss 160 from slipping off the tines 354a-354b.

A taught portion of floss 402 is shown. The taught portion of floss 402 may be the floss 160 that has been pulled across the two tines 354a-354b. The taught portion of floss 402 may be the section of the floss 160 that may be applied to the teeth when using the flosser end. The taught portion of floss 402 may be secured tightly to ensure that the taught portion of floss 402 may be inserted between the teeth of the user without being pulled off of the tines 354a-354b.

The floss 160 may be pulled across the tines 354a-354b. The floss 160 may be pulled into the return portion 352b of the routing path 352a-352b. Return floss 404 is shown. The return floss 404 may comprise a portion of the floss 160 that has been pulled past the tines 354a-354b and into the return portion 352b. The return floss 404 may be routed through the return portion 352b and back to the floss dispenser 150.

A locking component 406 is shown on the floss dispenser 150. The locking component 406 may be configured to receive the return floss 404. The locking component 406 may be configured to provide a secure hold and/or pull the return floss 404. By providing a secure hold and/or pulling the return floss 404, the locking component 406 may provide force to pull the floss 160 across the tines 354a-354b to form the taught portion of floss 402.

The type of locking component 406 implemented may be varied according to the design criteria of a particular implementation. In the example shown, the locking component 406 is shown as a component of the floss dispenser 150. In some embodiments, the locking component 406 may be implemented on the handle 102 (e.g., the locking component 406 may be implemented as part of the flat surface 120). For example, if the locking component 406 is implemented on the floss dispenser 150, then when the floss spool 230 is empty, the floss dispenser 150 may be replaced with another floss dispenser 150 that implements the locking component 406. If the locking component 406 is implemented on the handle 102, then the floss dispenser 150 may be implemented without the locking component 406. While the description generally describes the locking component 406 as being a component of the floss dispenser 150, the location of the locking component 406 may be varied according to the design criteria of a particular implementation.

In some embodiments, a second locking component similar to the locking component 406 may be implemented near the outgoing portion 352a. In some embodiments, the tension of the floss 160 from the floss spool 230 may provide sufficient force to create the taught portion of floss 402. In some embodiments, the second locking component may hold the floss 160 near the outgoing portion 352a and the locking component 406 may hold the return floss 404 near the return portion 352b to create the tension for the taught portion of floss 402.

In one example, the locking component 406 may be implemented as a spinning wheel configured to rotate above the floss dispenser 150. For example, the spinning wheel may be connected to the floss dispenser 150 and may rotate freely without disconnecting from the floss dispenser 150. The return floss 404 may be held against the spinning wheel and the rotation of the spinning wheel may grab the return floss 404 to spool the return floss 404 around the spinning wheel. The spooling of the return floss 404 around the spinning wheel may generate a pulling force on the return floss 404, which may pull the return floss 404 through the return portion 352b, which may pull the floss 160 across the tines 354a-354b to create the taught portion of floss 402.

In another example, the locking component 406 may be implemented as a compression lock. For example, the locking component 406 may be spring loaded to enable the locking component 406 to be pressed down and held in a lower position when pressed once and then released from the lowered position when pressed again. The return floss 404 may be pulled by the user under the compression lock and the user may press the compression lock to hold the return floss 404 in place while the compression lock is in the lowered position. The compression lock may hold the return floss 404 which may prevent the taught portion of floss 402 from being pulled off the tines 354a-354b.

The user may pull the floss 160 from the floss dispenser 150 through the outgoing portion 352a of the routing path 352a-352b and onto the tine 354a. The user may pull the floss 160 across the tines 354a-354b to form the taught portion of floss 402. The user may pull the floss 160 through the return portion 352b (e.g., as the return floss 404) and secure the floss 160 to the locking component 406. The user may floss the teeth using the flosser end comprising the taught portion of floss 402. As the user cleans teeth with the flosser end, the taught portion of floss 402 may become dirty. The user may release the return floss 404 from the locking component 406 and pull additional floss 160 from the floss dispenser 150. New floss (e.g., a clean portion) from the floss dispenser 150 may then be pulled across the tines 354a-354b to provide a new clean section of the floss 160 for the taught portion of floss 402. The used portion (e.g., dirty portion) of floss that was previously across the tines 354a-354b may be pulled into the return portion 354b and may be locked into place using the locking component 406. Eventually the used floss may be pulled beyond the locking component 406 and may be cut off by the cutter 152. New clean floss may be pulled out of the floss dispenser 150 and the used floss may be cut off using the cutter 152. When there is no new clean floss available from the floss dispenser 150, then the floss dispenser 150 (or the spool of floss 230) may be replaced.

Figure 9:
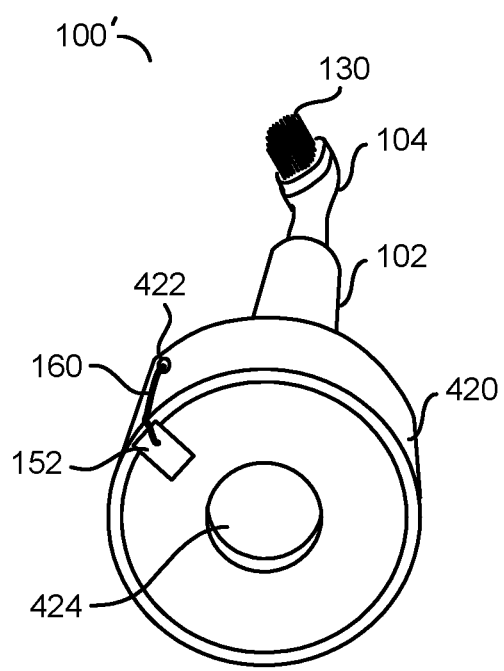
FIG. 9 is a diagram illustrating a toothbrush stand with a floss dispenser.

Referring to FIG. 9, a diagram illustrating a toothbrush stand with a floss dispenser is shown. An example embodiment of the toothbrush 100' is shown. The toothbrush 100' may comprise the handle 102 and the toothbrush head 104. The toothbrush 100' may be implemented without the cover 106. In some embodiments, the handle 102 and the toothbrush head 104 may be a single piece (e.g., the toothbrush 100' may be a single-piece construction).

A stand 420 is shown. The stand 420 may be removably attached to the handle 102. For example, the toothbrush 100' may be placed onto the stand 420 in order to secure the toothbrush 100' when not being used. The toothbrush 100' may be removed from the stand 420 in order to enable brushing the teeth.

The toothbrush 100' with the stand 420 is shown from a bottom view. Generally, when the toothbrush 100' is stored in the stand 420, the toothbrush 100' may stand in an upright position. The stand 420 may comprise the cutter 152 and a floss opening 422. The floss 160 may be pulled out of the floss opening 422. The floss opening 422 may have an implementation similar to the floss opening 154 shown in association with FIG. 1. The desired amount of floss 160 may be pulled from the floss opening 422 and then cut by the cutter 152. In the example shown, the cutter 152 may be implemented on a bottom of the stand 420. The location of the cutter 152 on the stand 420 may be varied according to the design criteria of a particular implementation.

A socket 424 is shown. The socket 424 is shown running through the length of the stand 420 (e.g., a through hole). The socket 424 may be configured to provide a friction fit for the toothbrush 100'. In an example, the bottom end 202 of the handle 102 may be configured to fit into the socket 424. The socket 424 may be sized to provide a secure fit for the handle 102 in order to hold the toothbrush 100' upright. The socket 424 may have a diameter with a size that may be slightly larger than the diameter of the handle 102 (e.g., to provide a friction fit). In some embodiments, the socket 424 may be implemented as a blind hole (e.g., the socket 424 may not be visible from the bottom of the stand 420, as shown).

The shape of the socket 424 within the stand 420 may form a groove. The groove formed by the socket 424 within the stand 420 may provide a spool within the stand 420. For example, the stand 420 may be generally hollow to enable storage of objects. The spool (or groove) formed by the shape of the socket 424 may enable the floss 160 to be stored within the stand 420. For example, the floss 160 may be wound around the groove of the socket 424 inside the stand 420 to provide a spool of floss. The spool of floss may be unwound by pulling the floss 160 from the floss opening 422. The stand 420 may be opened in order to add new floss to the floss spool formed by the socket 424. For example, the user may wind new floss around the socket 424 to form a floss spool when the stand 420 is opened. For example, when the spool of floss runs out, additional floss may be spooled around the groove created by the socket 424.

Figure 10:
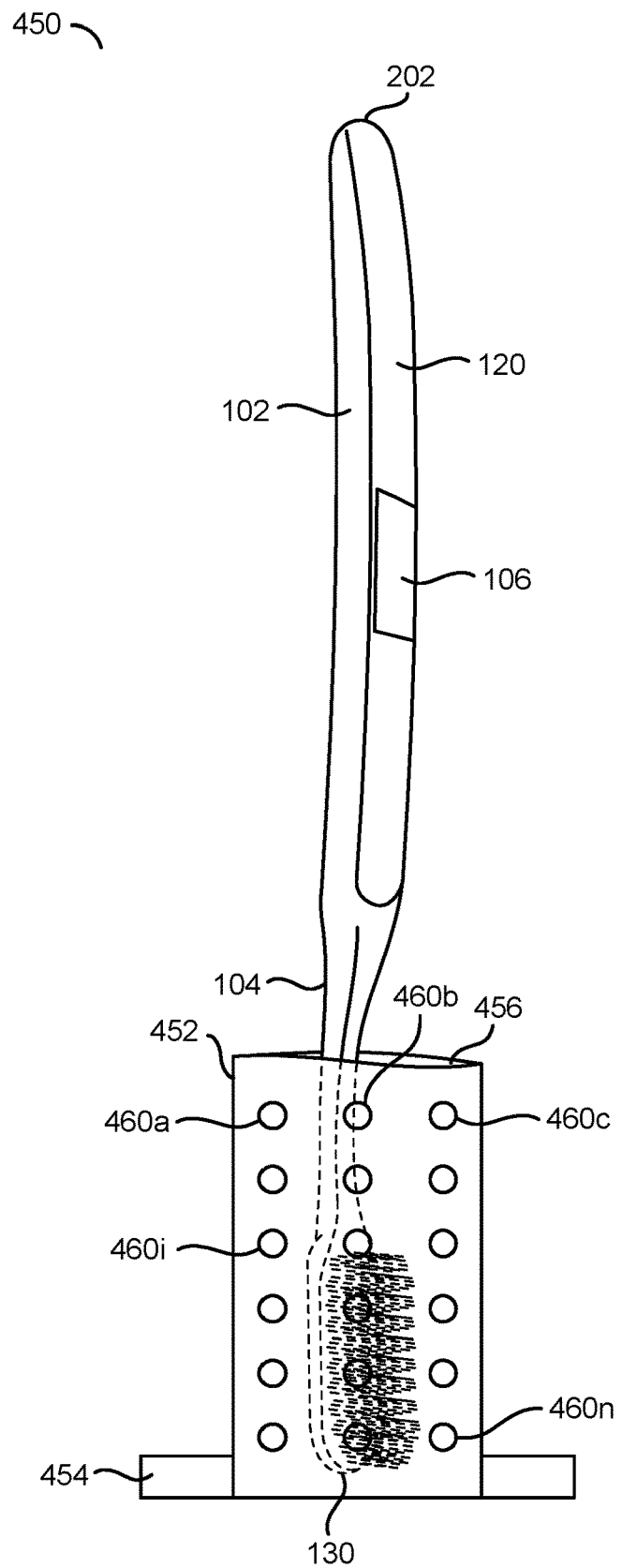
FIG. 10 is a diagram illustrating a container and stand for the toothbrush.

Referring to FIG. 10, a diagram illustrating a container and stand for the toothbrush is shown. An embodiment 450 of the toothbrush 100 is shown. The handle 102, the toothbrush head 104 and the cover 106 of the toothbrush 100 is shown with a vented cover 452.

The toothbrush 100 is shown with the toothbrush head 104 within the vented cover 452. The orientation of the bottom end 202 of the handle 102 is shown standing upright (e.g., at a top) when the toothbrush 100 is stored in the vented cover 452. The cover 106 is shown closed on the flat surface 120 of the handle 102. With the cover 106 fit over the cavity 210, the cavity opening 122 may not be visible and the contents of the cavity 210 (e.g., the floss dispenser 150) may not be visible. The cover 106 is shown generally flush with the flat surface 120.

The vented cover 452 may comprise a stand 454. The stand 454 may provide support for the vented cover 452. The support provided by the stand 454 may enable the vented cover 452 to hold the toothbrush 100 upright. For example, the support provided by the stand 454 may enable the vented cover 452 to hold the toothbrush 100 upside down with the bottom end 202 of the handle 102 in the air.

A cover opening 456 is shown. The cover opening 456 may enable the toothbrush 100 to be inserted into the vented cover 452. In the example shown, the cover opening 456 may be a large opening (e.g., the entire width of the vented cover 452). In another example, the cover opening 456 may be small enough to provide a secure hold on the toothbrush 100. In some embodiments, a lid may be attached over the cover opening 456 to provide a seal for the vented cover 452.

In the example shown, the toothbrush head 104 is shown inserted into the vented cover 452. The bristles 130 are shown at a bottom of the vented cover 452 and the handle 102 is shown extending out of the vented cover 452. The vented cover 452 may enable the toothbrush 100 to be stored with the handle 102 inserted in the vented cover 452 (e.g., with the bristles 130 in the air). Storing the toothbrush 100 with the bristles 130 at the bottom of the vented cover 452 may enable excess water to drain off the bristles 130 and into the vented cover 452 (e.g., excess water on the bristles 130 caused by rinsing the bristles 130 after use) instead of the excess water draining down the handle 102 if the bristles 130 are stored upright in the air (e.g., if the handle 102 is inserted in the vented cover 452).

Holes 460a-460n are shown on the vented cover 452. The holes 460a-460n may be perforations through the vented cover 452. The holes 460a-460n may be implemented at various locations on the vented cover 452. In the example shown, the holes 460a-460n may be generally spaced evenly around the vented cover 452.

The holes 460a-460n may provide a vent. The holes 460a-460n enable airflow through the vented cover 452. The airflow enabled by the holes 460a-460n may facilitate drying the excess water from the bristles 130 and/or the toothbrush 100. The holes 460a-460n may help the bristles 130 remain fresh and prevent mold and/or bacteria growth while the toothbrush 100 is stored in the vented cover 460a-460n.

In the example shown, the holes 460a-460n may not be located near the bottom surface of the vented cover 452. For example, by not having the holes 460a-460n near the bottom surface of the vented cover 452, excess water may not leak out of the vented cover 452. In some embodiments, the holes 460a-460n may be implemented near the bottom surface of the vented cover 452 to enable the excess water to drain out of the vented cover 452.

The vented cover 452 may provide a protective surface for the bristles 130 and/or the toothbrush 100. The vented cover 452 may provide storage for the toothbrush 100 (e.g., for use while traveling). For example, the vented cover 452 may be an accessory provided for a carrying case used for the toothbrush 100. The carrying case may provide storage for the toothbrush 100 during travel.

Referring to FIG. 11, a diagram illustrating a sliding cover in a closed position over a floss dispenser is shown. A view 500 of a portion of the handle 102 is shown. The view 500 may comprise the portion of the handle 102 with the cover 106. The cover 106 may be closed in order to conceal the cavity 210 and/or the floss dispenser 150. The cover 106 is shown on the flat surface 120.

The cover 106 is shown with a segmented implementation. The segmented implementation of the cover 106 may enable the cover 106 to slide open to reveal the cavity 210 (e.g., expose the floss dispenser 150) and slide closed to conceal the cavity 210 (e.g., hide the floss dispenser 150).

The cover 106 may comprise segments 502a-502d. The segments 502a-502d may be configured in a partially stacked (e.g., telescoping) orientation to enable the segments 502a-502d to slide over top of each other when the cover 106 is slid open. The segments 502a-502d are shown extended in order to conceal the cavity 210. In the example shown, four of the segments 502a-502d may be implemented. Other numbers of the segments (e.g., segments 502a-502n) may be implemented. The number of the segments 502a-502n for the cover 106 may be varied according to the design criteria of a particular implementation.

The notch 290 is shown on the segment 502a. The notch 290 may enable a user to push on the segment 502a to slide open the cover 106. An arrow 504 is shown. The arrow 504 may represent a direction of force applied to the cover 106 by a user. The user may apply the force 504 to the segment 502a to cause the segments 502a-502d to collapse onto each other in order to slide open the cover 106. In the example shown, the user may push the segments 502a-502c towards the left side of the flat surface 120 to open the cover 106.

Referring to FIG. 12, a diagram illustrating a sliding cover in an opened position over a floss dispenser is shown. A view 520 of a portion of the handle 102 is shown. The view 520 may comprise the portion of the handle 102 with the cover 106. The cover 106 may be opened in order to expose the cavity 210 and/or the floss dispenser 150. The cover 106 is shown on the flat surface 120.

The segments 502a-502c of the cover 106 are shown collapsed onto each other on one side of the cavity opening 122. When the segments 502a-502d are slid open, the segments 502a-502d may collapse onto each other (e.g., the segment 502d may be hidden from view below the other segments 502a-502c). By sliding the segments 502a-502d, the segments 502a-502d may slide into and/or stack onto each other to expose the cavity 210 and/or the floss dispenser 150.

With the cover 106 opened, the floss dispenser 150 is shown. The cutter 152 and the floss opening 154 are shown on the floss dispenser 150. The floss 160 is shown extending from the floss opening 154.

The surface depth 214 of the cavity 210 is shown. The surface depth 214 may be approximately one millimeter deep. For example, the floss dispenser 150 may sit in the cavity 210 and the top of the floss dispenser 150 may be one millimeter below the flat surface 120.

When the cover 106 is slid open, the user may apply the floss 160 for dental care. When the user is no longer retrieving the floss 160 from the floss dispenser 150, the user may close the cover 106. The user may slide the segments 502a-502c back to the closed position as shown in association with FIG. 11. In the example shown, the user may push the segments 502a-502c towards the right side of the flat surface 120 to close the cover 106.

Referring to FIG. 13, a diagram illustrating a cover with a hinge is shown. A view 540 of a portion of the handle 102 is shown. The view 540 may comprise the portion of the handle 102 with the cover 106. The cover 106 may be opened in order to expose the cavity 210 and/or the floss dispenser 150. The cover 106 is shown on the flat surface 120 partially opened.

The notch 290 is shown on the cover 106. The notch 290 may enable the cover 106 to be conveniently lifted in order for the cover 106 to swing open. As the cover 106 swings open, the floss dispenser 150 may be exposed. The floss dispenser 150 is shown below the surface depth 214.

The cover 106 may comprise hinge portions 542a-542b (e.g., hinge knuckles). In one example, the hinge portions 542a-542b may be formed from the material of the cover 106 (e.g., a plastic material that extends from the cover 106). The hinge portions 542a-542b may extend towards the flat surface 120.

The flat surface 120 may comprise complementary hinge portions 544a-544b (e.g., hinge knuckles). The complementary hinge portions 544a-544b may interlock with the hinge portions 542a-542b of the cover 106. Interlocking the hinge portions 542a-542b with the complementary hinge portions 544a-544b may connect the cover 106 to the flat surface 120 at one end of the cover 106 (e.g., the left side of the cover 106, in the example shown).

A hinge pin 546 is shown within the hinge portion 542a. The hinge pin 546 may extend through the hinge portion 542a and through the complementary hinge portion 544a. The hinge pin 546 may secure the hinge portion 542a to the complementary hinge portion 543a. The hinge portion 542a may rotate around the hinge pin 546. A similar hinge pin may be implemented through the hinge portion 542b and the complementary hinge portion 544b.

The hinge pin 546 may enable the cover 106 to swing (e.g., rotate) open and closed while being connected to the flat surface 120 of the handle 102. For example, the user may lift the cover 106 using the notch 290. Lifting the cover 106 may cause the hinge portions 542a-542b to rotate around the hinge pin 546 to expose the floss dispenser 150, while ensuring the cover 106 is still secured to the handle 102 (e.g., prevent the cover 106 from being lost).

Referring to FIG. 14, a diagram illustrating a cover with a dowel is shown. A view 560 of a portion of the handle 102 is shown. The view 560 may comprise the portion of the handle 102 with the cover 106. The cover 106 may be opened in order to expose the cavity 210 and/or the floss dispenser 150. The cover 106 is shown on the flat surface 120 partially opened.

Openings 560a-560b are shown. The openings 560a-560b may be blind holes (e.g., tunnels) under the flat surface 120. The opening 560a may be in the flat surface 120 at a location that corresponds to one side of the cover 106 and the opening 560b may be in the flat surface 120 at a location that corresponds to an opposite side of the cover 106. The openings 560a-560b may be implemented in the flat surface 120 at a location that may be on an opposite side of the cover 106 from the side of the cover 106 with the notch 290.

Dowels 562a-562b are shown. The dowels 562a-562b may extend from the cover 106. The dowels 562a-562b may be a part of the cover 106. For example, the dowels 562a-562b may be formed from the same material as the rest of the cover 106. The dowels 562a-562b may each be implemented on an opposite side of the cover 106. Both the dowels 562a-562b may be implemented on a side of the cover 106 opposite to the side of the cover 106 with the notch 290. The dowels 562a-562b may be inserted into the respective openings 560a-560b. The insertion of the dowels 562a-562b into the openings 560a-560b may form an attachment between the cover 106 and the flat surface 120. For example, once the dowels 562a-562b are inserted into the openings 560a-560b, the cover 106 may not be able to be easily removed from the flat surface 120 without breaking the dowels 562a-562b.

The dowels 562a-562b may have a loose fit within the openings 560a-560b. The loose fit may enable the dowels 562a-562b to rotate within the openings 560a-560b. The rotation of the dowels 562a-562b may enable the cover 106 to swing open and closed. For example, the user may lift the cover 106 using the notch 290. The force of the user lifting the cover 106 may cause the dowels 562a-562b to rotate within the openings 560a-560b so that the cover 106 may swing open. Similarly, the user may push down on the cover 106 to close the cover 106 over the floss dispenser 150 and the dowels 562a-562b may rotate within the openings 560a-560b to enable the cover 106 to swing closed.

The terms "may" and "generally" when used herein in conjunction with "is (are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:
   a handle comprising a flat surface, a cavity, a first connector, and a second cavity;
   a toothbrush head comprising (i) a plurality of bristles at a first end and (ii) a second connector at a second end;
   a cover configured to (i) expose said cavity when not placed over said cavity and (ii) conceal said cavity when said cover is fit over said cavity; and
   a second cover configured to expose one or more toothpaste containers when opened and conceal said one or more toothpaste containers when closed, wherein
   (a) said cavity is configured to store a floss dispenser,
   (b) said floss dispenser comprises floss and a cutter,
   (c) said cavity enables said floss dispenser to be replaced,
   (d) said floss dispenser is exposed on said flat surface when said cover is opened,
   (f) said first connector is configured to be removably attached to said second connector to enable said toothbrush head to connect with said handle,
   (g) said second cavity is configured to store said one or more toothpaste containers,
   (h) said one or more toothpaste containers comprise a flared end, and
   (i) twisting said flared end forces a single-use amount of toothpaste out of an opposite end of said toothpaste containers.

2. The apparatus according to claim 1, wherein said second cover is located on an end of said handle that is opposite to said first connector.

3. The apparatus according to claim 1, wherein said first connector and said second connector are configured to twist and snap together to enable a secure connection between said handle and said toothbrush head.

4. The apparatus according to claim 1, wherein (i) said toothbrush head comprises a light, a battery and a sensor, (ii) said battery is configured to provide power to said light and said sensor, (iii) said light is configured to indicate when to replace said toothbrush head and (iv) said sensor is configured to detect a stiffness of said plurality of bristles to determine when to replace said toothbrush head.

5. The apparatus according to claim 1, wherein (i) said toothbrush head comprises a color changing material and (ii) said color changing material is configured to change a color of said toothbrush head to indicate when to replace said toothbrush head.

6. The apparatus according to claim 1, wherein said cover is attached to said handle and rotates to conceal said cavity via a hinge to prevent said cover from being lost.

7. The apparatus according to claim 1, wherein (i) said cover is removably attached to said handle and (ii) said cover is configured to snap into said handle using a friction fit.

8. The apparatus according to claim 1, wherein said plurality of bristles are configured to provide a flossing action and a brushing action for teeth.

9. The apparatus according to claim 1, wherein (i) said toothbrush head is replaceable, (ii) a first replacement for said toothbrush head comprises said plurality of bristles that have a soft stiffness, (iii) a second replacement for said toothbrush head comprises said plurality of bristles that are a medium stiffness and (iv) a third replacement for said toothbrush head comprises said plurality of bristles that are a hard stiffness.

10. The apparatus according to claim 1, further comprising a vented cover, said vented cover configured to fit over said toothbrush head.

11. The apparatus according to claim 1, wherein said floss dispenser is at a level slightly below said flat surface of said handle.

12. An apparatus comprising:
    a handle comprising a flat surface, a cavity, and a first connector;
    a toothbrush head comprising (i) a plurality of bristles at a first end and (ii) a second connector at a second end; and
    a cover configured to (i) expose said cavity when not placed over said cavity and (ii) conceal said cavity when said cover is fit over said cavity, wherein
    (a) said cavity is configured to store a floss dispenser,
    (b) said floss dispenser comprises floss and a cutter,
    (c) said cavity enables said floss dispenser to be replaced,
    (d) said floss dispenser is exposed on said flat surface when said cover is opened,
    (f) said first connector is configured to be removably attached to said second connector to enable said toothbrush head to connect with said handle,
    (g) said toothbrush head comprises a light, a battery and a sensor,
    (h) said battery is configured to provide power to said light and said sensor,
    (i) said light is configured to indicate when to replace said toothbrush head, and (j) said sensor is configured to detect a stiffness of said plurality of bristles to determine when to replace said toothbrush head.

13. The apparatus according to claim 12, wherein said first connector and said second connector are configured to twist and snap together to enable a secure connection between said handle and said toothbrush head.

14. The apparatus according to claim 12, wherein (i) said toothbrush head comprises a color changing material and (ii) said color changing material is configured to change a color of said toothbrush head to indicate when to replace said toothbrush head.

15. The apparatus according to claim 12, wherein said cover is attached to said handle and rotates to conceal said cavity via a hinge to prevent said cover from being lost.

16. The apparatus according to claim 12, wherein (i) said cover is removably attached to said handle and (ii) said cover is configured to snap into said handle using a friction fit.

17. The apparatus according to claim 12, wherein said plurality of bristles are configured to provide a flossing action and a brushing action for teeth.

18. The apparatus according to claim 12, wherein (i) said toothbrush head is replaceable, (ii) a first replacement for said toothbrush head comprises said plurality of bristles that have a soft stiffness, (iii) a second replacement for said toothbrush head comprises said plurality of bristles that are a medium stiffness and (iv) a third replacement for said toothbrush head comprises said plurality of bristles that are a hard stiffness.

19. The apparatus according to claim 12, further comprising a vented cover, said vented cover configured to fit over said toothbrush head.

20. The apparatus according to claim 12, wherein said floss dispenser is at a level slightly below said flat surface of said handle.

\* \* \* \* \*